J. E. R. BEST.
LUMBER MEASURING INSTRUMENT.
APPLICATION FILED OCT. 30, 1916.
1,275,370.
Patented Aug. 13, 1918.
3 SHEETS—SHEET 2.
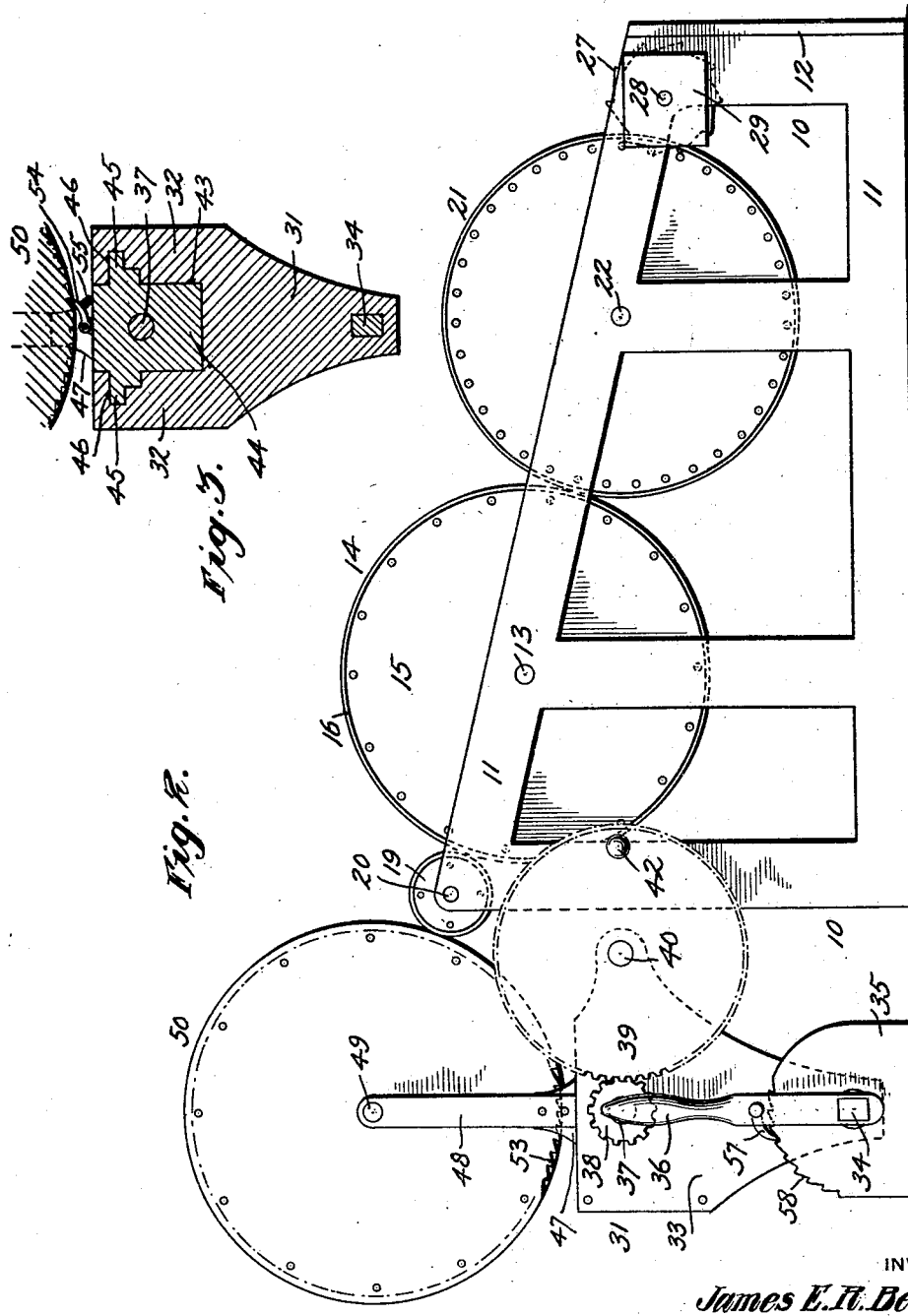
WITNESSES
INVENTOR
James E. R. Best
BY
ATTORNEY

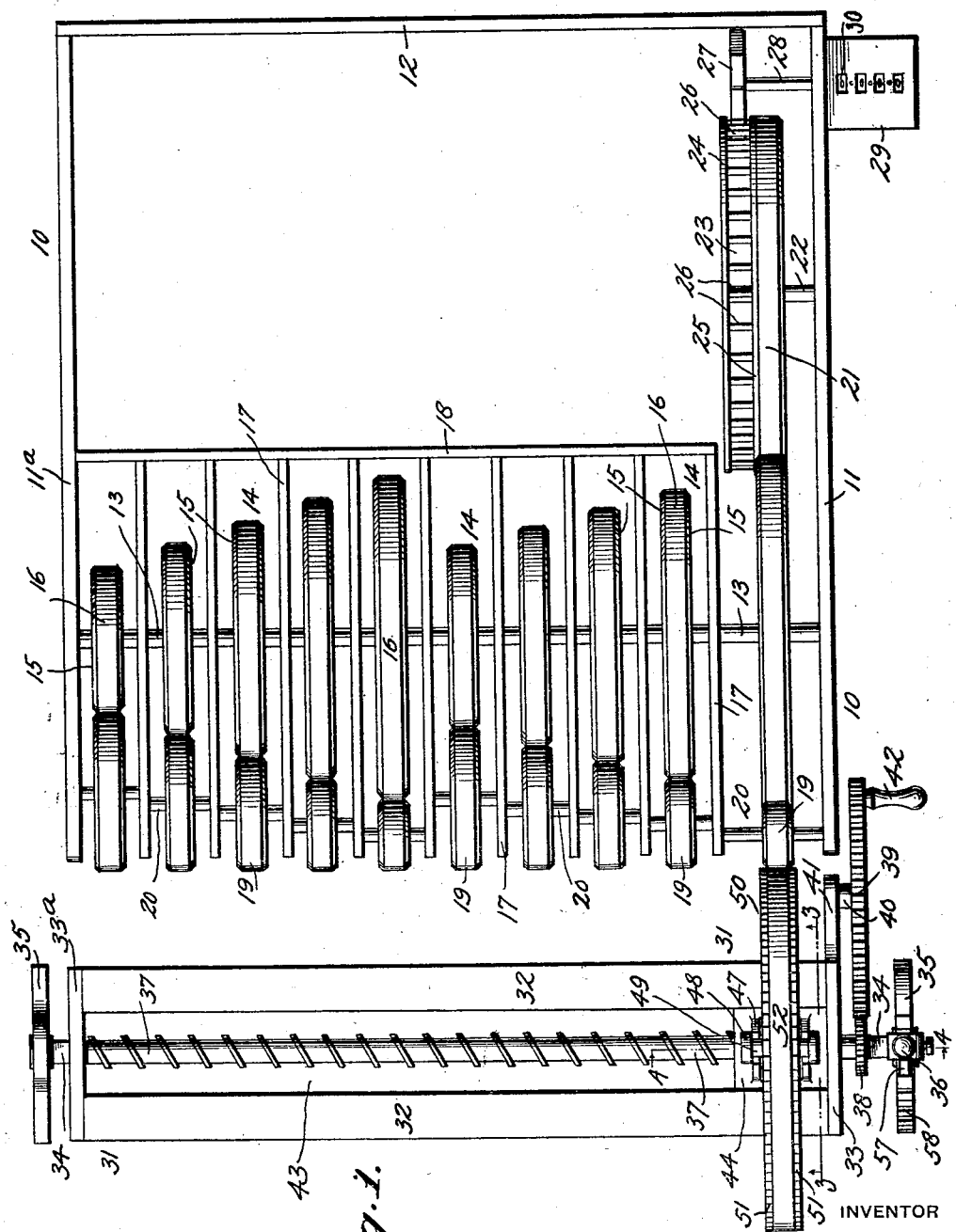

J. E. R. BEST.
LUMBER MEASURING INSTRUMENT.
APPLICATION FILED OCT. 30, 1916.

1,275,370.

Patented Aug. 13, 1918.
3 SHEETS—SHEET 3.

WITNESSES
W. C. Fielding
A. P. Hollingsworth

INVENTOR
James E. R. Best
BY Richard Owen,
ATTORNEY

UNITED STATES PATENT OFFICE.

JAMES E. R. BEST, OF BOYCEVILLE, WISCONSIN.

LUMBER-MEASURING INSTRUMENT.

1,275,370.   Specification of Letters Patent.   Patented Aug. 13, 1918.

Application filed October 30, 1916. Serial No. 128,577.

*To all whom it may concern:*

Be it known that I, JAMES E. R. BEST, a citizen of the United States, residing at Boyceville, in the county of Dunn and State of Wisconsin, have invented certain new and useful Improvements in Lumber-Measuring Instruments, of which the following is a specification.

This invention relates to measuring instruments broadly, and particularly to a scaling machine for registering the number of board feet in boards of different thicknesses and lengths, the object being to provide a machine that is simple in its construction, has relative few parts and is accurate in performing the functions called for.

Another object of the invention is to provide a scaling machine having a rotating wheel over which a board of given length is placed and moved tranversely causing a rotation of the wheel that, through gearing operated thereby, turns a register and indicates thereon the number of board feet in the board.

A further object of the invention is to provide a machine of this type in which the rotating wheel may be moved longitudinally of the machine and brought into engagement with any one of a series of intermediate gears that will operate the register at different speeds when boards of varying thicknesses and lengths are run over the machine.

A still further object of the machine is to provide in a scaling machine of the type set forth a simple and positive and rapid means of adjusting the rotating wheel into operative position with one of a series of intermediate gears, whereby a register is caused to indicate the number of board feet in a board of given length and thickness when passed over the machine.

With these as the principal objects in view and other objects to be set forth more in detail in the following description, the invention consists of the novel construction, combination, and arrangement of parts hereinafter described, set forth in the appended claims and illustrated in the accompanying drawings, in which—

Figure 1 is a top plan view of the machine complete,

Fig. 2 is a side elevation of the machine,

Fig. 3 is a sectional view on the line 3—3 of Fig. 1,

Figure 5:
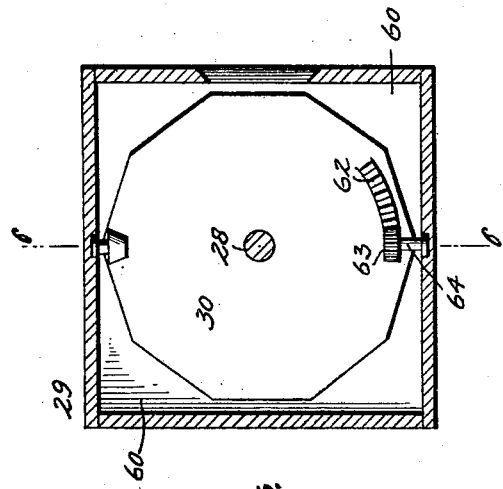
Figs. 5 and 6 are detail sectional views of the registering mechanism.

In the drawings, 10 indicates a strong frame comprising two upright side plates 11 and 11ª connected together at one end by a cross plate 12. Near the end of the frame 10 opposite the cross plate 12 is journaled a horizontal shaft 13, the ends of said shaft being carried by the side plates 11 and on said shaft are secured a plurality of friction wheels 14 of varying diameters as shown clearly in Fig. 1. These wheels are each made preferably with metal side plates 15, between which are clamped a disk or annulus 16 of some fibrous material, such as paper, wood or the like material that will afford frictional surface on its peripheral edge. Between each two friction wheels 14 is secured a plate 17, said plates extending longitudinally beyond the peripheries of the wheels 14 and at one end are connected to a transverse plate 18 that is secured in turn at one end to one of the side plates 11 of the frame. Between the opposite ends of each of two plates 17 and between the side plates 11 and 11ª and the plates 17 adjacent thereto is placed a pulley 19, each of which pulleys is mounted on a short shaft 20 journaled in the adjacent plates; these pulleys, as shown, being of different diameters and formed of side plates 15 and a fiber center 16 exactly like the wheels 14. Each pulley 19 is in line with one of the wheels 14 and frictionally in contact with the periphery thereof so that whenever any one of the pulleys is rotated, the wheel in contact therewith is also turned and also the shaft 13. The proportions between the wheels 14 and the pulleys 19 in frictional contact therewith are such that the sides of all the pulleys 19 opposite the wheels are in a straight line parallel to the axis of the shaft 13 for a purpose to be described later.

In rear of the wheel 14 nearest the side frame 11 is a friction wheel 21 in contact with said wheel 14 and rotatable on a stub shaft 22 carried on the inner side of the frame plate. This friction wheel 21 made similar to the wheel 14 with a fiber center and metal plates carries on its inner side a toothed wheel 23 here shown as being formed of two spaced plates 24 and 25 connected by a number of pins 26 that lie parallel to the axis of the shaft 22 and are spaced apart a suitable distance to rotate a toothed wheel 27 engageable therewith fixed on the shaft 28 of a register 29.

Adjacent the end of the frame 10 in which the pulleys 19 are mounted is a rigid transverse guide 31 formed of two parallel beams 32 connected together at their ends by plates 33 and 33$^a$ that are in line with the side plates 11 and 11$^a$. The guide 31 is carried by a rectangular shaft 34 which extends longitudinally through the guide and parallel with the beams 32 near the floor and pivotally mounted at their ends in bearing plates 35 that lie beyond plates 33 and 33$^a$. This shaft is mounted to rock in the bearing plates 35 and has connected to one end an upright hand lever 36, the lower end of which is divided to straddle the adjacent plate 35 and be secured on the end of the shaft 34, by means of which said shaft is rocked. Journaled in the plates 33, 33$^a$ of the guide 31 is a screw shaft 37 parallel to the shaft 34 and situated near the top of the guide. One end of the screw shaft 37 projects through the plate 33 and has secured thereon a pinion 38 which is engaged by a larger gear 39 journaled on a stub shaft 40 that projects outwardly from a bracket 41 extending rearwardly from the plate 33. On the gear wheel 39 is a handle 42 by means of which said gear wheel is rotated and through the pinion 38 rotation is given to the screw shaft 37.

The beams 32 of the guide 31 are spaced apart to provide a channel-way 43 that extends from end to end of the guide and in this channel-way is seated a block 44 having laterally projecting flanges 45 that engage ways 46 cut in the inner faces of the beam 32. By this means the block 44 is enabled to move freely from end to end of the guide but is prevented from becoming disengaged therefrom. Through the block 44 is formed a threaded opening for the screw shaft 37 so that upon turning the gear wheel 39 and rotating the screw shaft the block is caused to move endwise along the guide 31.

Projecting upwardly from the top of the block 44 are two lugs 47 spaced apart, to each of which is riveted an upstanding arm 48, said arms forming a bearing for a short shaft 49 on which is mounted a wheel 50 which may be termed a scaling wheel, said wheel being formed of two metal side plates 51 and a central disk 52 preferably of rubber of slightly greater diameter than the plates 51, which latter are provided with ratchet teeth 53 on their periphery that are engaged by pawls 54 pivotally mounted on the block 44 just below the disks. Springs 55 hold the pawls in engagement with the ratchets to prevent reverse rotation of the scale wheel 50.

In using the scaling machine above described, let it be assumed that it is desired to ascertain the number of board feet in a lot of boards 12 and 14 feet long of various widths and standard thicknesses. The scaling wheel 50 if in any position other than that shown in Fig. 1 is moved into such position by grasping the lever 36 with the left hand and raising the locking dog 57 that is engaged with teeth 58 on the upper edge of plate 35, moving said lever to the left, which action rocks the guide 31 in the same direction and withdraws the scaling wheel 50 from contact with any one of the pulleys 19 with which it may be engaged. Holding the lever 36 in the position described with the left-hand, the gear wheel 39 is rotated in proper direction to turn the worm shaft 37 and cause the block 44 to move endwise on the guide 31 until the scaling wheel is in line with the pulley 19 nearest the side plate 11. The guide 31 is then rocked in the opposite direction through the hand lever 36 until the scaling wheel is brought into frictional engagement with said pulley, whereupon the pawl 57 engages the teeth 58 and holds said wheel and pulley in contact. The machine is now ready to register the number of square or board feet in all boards having the length of 12 feet and a thickness of one inch, it being only necessary to place one edge of the board against the scaling wheel 50 and the said board resting on the wheel is moved laterally thereover. This movement causes the wheel to turn a peripheral distance equal to the width of the board, which if the latter be 8 inches wide will turn the wheel 50 a peripheral distance of 8 inches, which movement through the pulley 19 and wheel 14 turns the friction wheel 21 and toothed wheel 23 mounted thereon a distance sufficient to turn the first disk 30 through the registering wheel 27 far enough to indicate the numeral 8 which shows that the board contains 8 feet. The scaling wheel 50 will remain in the position indicated during the continuance of the measurement of boards 12 feet long and one inch thick irrespective of the width. Whenever thicker or longer boards are to be scaled the scaling wheel 50 will be shifted. If the boards are 1$\frac{1}{4}$ inches thick but of the same length the wheel 50 will be moved in the manner described to engage the next succeeding pulley 19 which is so proportioned with relation to the wheel 16 that the latter will be revolved faster than the first wheel 14 and this increased speed being carried by the shaft 13 and first wheel 14 to the friction wheel 21, the register will move a distance indicating 10 feet if the board measured be 8 inches wide. The next three wheels 14 following with their pulleys 19 are proportioned for boards having thicknesses of an inch and a half, inch and three quarters, and two inches, respectively. The remaining wheels are proportioned for boards 14 feet long and of the several fractional thicknesses from one to two inches.

The pitch of the screw shaft 37 is such and the proportions between the gear wheel 39 and pinion 38 of a degree that it requires but few turns of the gear wheel 39 to move the block 44 with the scaling wheel 50 from end to end of the guide 31. No time, therefore, is lost in shifting the wheel 50 to suit the board to be scaled as it may be done in the time that elapses between the completion of one board and the bringing of a second board in position to be scaled.

It is to be understood that the proportion between the wheels 14 and pulleys 19 may be varied to suit conditions, the series being grouped for scaling the boards of such lengths and thicknesses as most desired by the operator.

Figure 6:
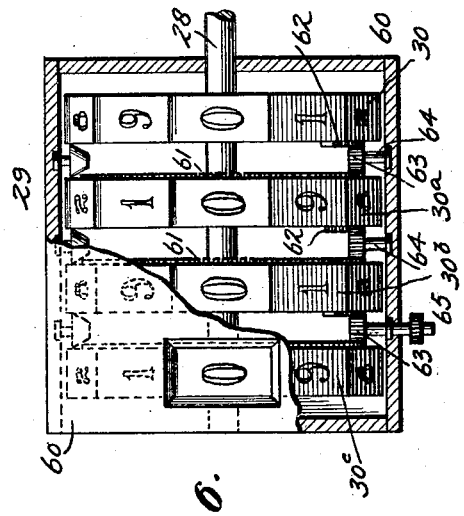
Figure 4:
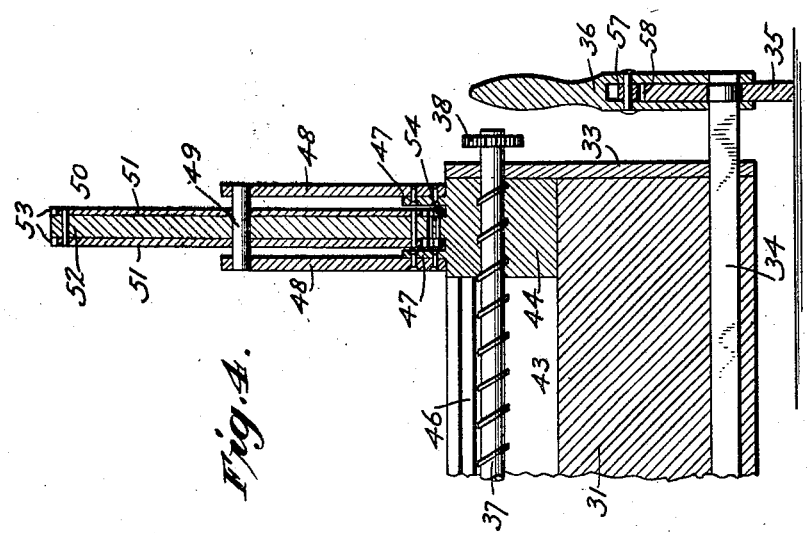
Fig. 4 is a transverse sectional view on the line 4—4 of the same figure.

Figs. 5 and 6 show one form of registering mechanism which may be used in connection with this machine, and briefly described comprises a shaft 28 on which the tooth register operating wheel 27 is mounted, the inner end of said shaft passing into a case 60 where it carries a series of number wheels 30, 30$^a$, and 30$^b$ and 30$^c$ capable of registering 9999 board feet of lumber. The number wheel 30 is fixed on the shaft 28, the three remaining wheels turning loosely thereon. On the right side of each number wheel 30$^a$, 30$^b$ and 30$^c$ is an annular row of gear teeth 61, while on the opposite or facing side of each number wheel 30, 30$^a$ and 30$^b$ is a short segmental series of teeth 62. Between and engaging each series of teeth 61 and 62 is a pinion 63, each pinion turning on a stub shaft 64 mounted within the casing 60. Each complete rotation of the unit number wheel 30 will cause the segmental teeth 62 to turn the pinion 63, which in turn moves the tens wheel 30$^a$ one number, the number of teeth 62 being only sufficient for imparting a tenth of a revolution to the wheel 30$^a$. This latter wheel in turn upon the completion of one revolution moves the hundredths wheel 30$^b$ one tenth of a revolution and this wheel in turn imparts a like movement to the thousandths wheel 30$^c$ when it completes a rotation. 65 indicates an electric key mounted in the casing and is operated to close a circuit with a register, placed in an office or some other convenient position each time the register 29 counts a thousand feet. This is not necessary for the operation of the machine, but is a convenience appreciated by those in charge.

What I claim is:

1. A machine of the class described comprising a scaling wheel rotatable by the transverse movement of boards in contact therewith, a register, a plurality of trains of gearing of different sizes, all of said trains being each connected to said register for operating the same, and means for moving said scaling wheel directly into engagement with any one of said trains of gearing to operate said register upon the passage of a board over and in contact with the scaling wheel.

2. A machine of the class described comprising a scaling wheel rotatable by the transverse movement of boards in contact therewith, a register, a plurality of parallel trains of gearing, each train adapted to be driven directly by the scaling wheel at different speeds, a shaft having one wheel of each train fixed thereon, means connecting said shaft to the register for operating the latter, and means for moving said scaling wheel into engagement with any one of said trains of gearing to operate said register upon the passage of a board over the scaling wheel.

3. A machine of the class described comprising a scaling wheel rotatable by the transverse movement of boards in contact therewith, a register, a shaft, means connecting said shaft to the register for operating the latter, a plurality of wheels of different diameters fixed on said shaft, a plurality of other wheels of different diameters each mounted to drive one of the wheels on said shaft and having one side of their peripheral surfaces in a plane parallel with the axis of the scaling wheel, and means for moving said scaling wheel into engagement with any one of said trains of gearing to operate said register upon the passage of a board over the scaling wheel.

4. A machine of the class described comprising a scaling wheel rotatable by the transverse movement of boards in contact therewith, a rocking frame carrying said scaling wheel, a register, a shaft, means connecting said shaft to the register for operating the latter, a plurality of wheels of different diameters fixed on said shaft, a plurality of other wheels of different diameters each mounted to drive one of the wheels on said shaft and all having one side of their peripheral surfaces in a plane parallel with the axis of the scaling wheel, means for moving said scaling wheel axially into alinement with any one of said latter named wheels, and means for rocking the scaling wheel frame to cause the engagement of the scaling wheel and the wheel with which it is alined to operate the register upon the passing of a board over the scaling wheel.

5. A machine of the class described comprising a wheel rotatable by the transverse movement of boards in contact therewith, a register, a shaft, means connecting said shaft to the register for operating the latter, a plurality of trains of gearing of different sizes, each train adapted to drive said shaft and each train having one side of the peripheral surface of one of its wheels in a plane parallel with the axis of the scaling wheel, a rocking frame carrying said scaling wheel and extending transversely across said trains of gearing, a worm shaft extending longitudinally of said rocking frame, means for rotating said worm shaft for moving said scaling wheel in line with any one of said trains of gearing, and means for rocking said scaling wheel frame to engage and disengage said scaling wheel and one of said trains of gearing.

6. A machine of the class described comprising a scaling wheel rotatable by the transverse movement of boards in contact therewith, a plurality of trains of gearing of different sizes connected with and adapted to operate a register, a rocking frame carrying said scaling wheel and extending transversely of said trains of gearing, a block slidable longitudinally in said rocking frame provided with bearings for the scaling wheel, a screw shaft mounted in the rocking frame and adapted to move said block and scaling wheel, manual means for rotating said screw shaft for alining said scaling wheel with any one of said trains of gearing, and means for rocking the scaling wheel to and from a train of gearing.

7. A machine of the class described comprising a scaling wheel rotatable by the transverse movement of boards in contact therewith, a plurality of trains of gearing of different sizes, a register operable by each of said trains, a rocking frame extending transversely of said trains, a block slidably mounted in said rocking frame and movable longitudinally thereof, bearings carried by said block for said scaling wheel, a screw shaft mounted in said rocking frame and having threaded engagement with said block, manually operated means on the rocking frame for turning said shaft and moving said block and scaling wheel in alinement with any one of said trains of gearing, and means for rocking said frame to engage said scaling wheel with the alined frame.

8. A machine of the class described comprising a rigid frame, a shaft mounted transversely in said frame, a plurality of wheels of different diameters fixed on said shaft, a register mounted on said frame, intermediate gearing between said shaft and said register for operating the latter, a plurality of pinions of different diameters each operatively engaged with one of the wheels on the transverse shaft, the outer side of the periphery of each of said pinions alining, a rocking frame adjacent said pinions, a block slidable longitudinally therein, a scaling wheel mounted in bearings on said block, a worm shaft extending longitudinally of the rocking frame and adapted to move the block endwise therein for the purpose of alining the scaling wheel with any one of said pinions, and means for moving said scaling wheel into engagement with the alined pinion and maintaining such engagement.

In testimony whereof I affix my signature in presence of two witnesses.

JAMES E. R. BEST.

Witnesses:
  NETTIE DUNCAN,
  LAURA DUNCAN.

Copies of this patent may be obtained for five cents each, by addressing the "Commissioner of Patents, Washington, D. C."